3,007,974
Patented Nov. 7, 1961

3,007,974
CHLORINATION PRODUCTS OF CYCLODODECA-TRIENE PROCESS
Samuel B. Lippincott, Springfield, N.J., assignor to Esso Research and Engineering Company, a corporation of Delaware
No Drawing. Filed Mar. 2, 1959, Ser. No. 796,282
3 Claims. (Cl. 260—648)

The present invention relates to new compositions of matter and to methods of preparation of these new compositions of matter. More particularly, this invention relates to the preparation of 9,10-dichloro-1,5-cyclododecadiene, 5,6,9,10-tetrachlorocyclododecene and 1,2,5,6,9,10-hexachlorocyclododecane. Yet more particularly, this invention relates to the preparation of the above identified compounds by the addition of chlorine to the double bonds of 1,5,9-cyclododecatriene. Most particularly, and in a preferred embodiment, 1,5,9-cyclododecatriene is reacted with sulfuryl chloride to obtain high yields of the di-, tetra-, and hexachloro derivatives of the compound.

The commercial use of chlorinated paraffins at this time is well known. The di-, tetra- and hexachloro derivatives of cyclododecatriene of this invention will be of use as substitutes for these materials. Thus, the hexachloro derivative will be useful in the preparation of flame-proof or flame retardant paints and in the manufacture of flame-proof textile materials. Additionally, these materials and the di- and tetrachlorinated derivatives will be useful in plasticizers and plasticizer extenders used in plastics and synthetic rubber. They may be also used in extreme pressure lubricants. In addition these compounds, particularly those still containing a double bond, may be used as intermediates in the synthesis of other new and useful products. For example, the remaining double bonds may be epoxidized to give chloro-epoxy-cyclododecanes. Oxidation of the tetrachloro derivative would be expected to yield tetrachlorododecanedioic acid which, in turn, could be incorporated into polyester resins and the like to impart flame resistance and other novel properties to the resin.

The cyclododecatriene starting materials of this invention is known in the art, being prepared by trimerizing butadiene with alkyl metal type catalysts, its preparation and description being described for example in Angewandte Chemie v. 69, No. 11:397 (June 7, 1957). Although four stereo isomers of 1,5,9-cyclododecatriene are theoretically possible only two have thus far been isolated. These are the cis, trans, trans, (cis., tr., tr.) and the trans, trans, trans, (tr., tr., tr.) isomers as shown by the formulas below.

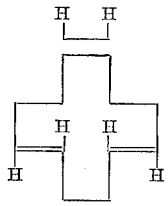
Cis., tr., tr.
M.P.,−18° C.

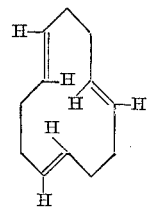
Tr., tr., tr.
M.P., 34° C.

Throughout this specification it will be assumed that either of the isomers above represented or of the other isomers may be utilized or mixtuers thereof.

The new composition of matter, 9,10-dichloro-1,5-cyclododecadiene was isolated from the product obtained utilizing less than 1 mole of chlorine or sulfuryl chloride per mole of cyclododecatriene in the chlorination. This material distilled at 93–97° C. at 0.15 mm. pressure and had an index of refraction, $n^{20}/D$, 1.532–1.533. Various fractions of this product analyzed 29–31% chlorine. The theoretical value for $C_{12}H_{18}Cl_2$ is 30.41%.

The new composition of matter, 5,6,9,10-tetrachlorocyclododecene was isolated as a residue from a mixture obtained by treating cyclododecatriene in carbon tetrachloride with 1.75 moles of chlorine and removing the dichlorocyclododecadiene by distilling to a vapor temperature of 160° C. at 0.06 mm. The product analyzed is 46.6% chlorine. Theory for $C_{12}H_{18}Cl_4$ is 46.64%.

The new composition of matter 1,2,5,6,9,10-hexachlorododecane was obtained by treating cyclododecartiene with three moles of chlorine or sulfuryl chloride. It was isolated as a high boiling distillation residue. This residue, a dark viscous liquid contained 53.0% chlorine. The theoretical value for the hexachloride is 56.7%.

The process utilizing chlorine gas for halogen addition may be carried out at temperatures of −10° C. to 100° C., preferably 10° C. to 60° C., annd pressures of less than one to 100 atmospheres, preferably at atmospheric pressure. The chlorine gas is supplied at a rate such that it substantially reacts as added and such that the heat liberated does not exceed the capacity of the heat exchanger to remove heat. Usually it will be desirable to utilize a solvent for the cyclododecatriene such as liquid saturated hydrocarbons, liquid aromatic hydrocarbons, liquid halogenated hydrocarbons and carbon disulfide, preferably carbon tetrachloride, chloroform, carbon disulfide, cyclohexane, n-heptane, etc. in order to reduce the severity of the reaction, reduce the formation of high boiling side products and to control temperature in the exothermic reaction. By controlling the amount of chlorine added larger amounts of the 5,6,9,10-tetrachloro-1,2-cyclododecene may be obtained. Alternatively, or additionally, increased yields of this material can be obtained by recycling the dichloro compound. 1,2,5,6,9,10-hexachlorocyclododecane is preferably obtained by utilizing a slight excess of chlorine to cyclododecatriene over the stoichiometric amount to obtain the hexachloro derivative in the chlorination. Amounts of chlorine utilized should be not more than 150 wt. percent chlorine based on the cyclododecatriene. To obtain preferentially the dichloro derivative amounts of chlorine should be in the range of 10–55 wt. percent based on cyclododecatriene, to obtain the tetrachloro derivative amounts of chlorine utilized should be in the range of 65–100 wt. percent based on cyclododecatriene and to obtain the hexachloro derivative amounts of chlorine utilized should be in the range of 110–140 wt. percent based on the cyclododecatriene.

The preparation of the chlorinated derivatives utilizing sulfuryl chloride is carried out at temperatures of 10° C. to 150° C., preferably 50° C. to 100° C. Usually the temperature will be determined by the boiling point of the reaction mixture at the pressure employed and means should be provided for the escape of the sulfur dioxide as formed. It is most convenient to operate at atmospheric pressure and allow the sulfur dioxide to escape as through a reflux condenser. However, partial vacuum or moderate pressure may be used if desired. Again the amount of chlorination agent used determines the amount of di-, tetra- and hexachloro derivatives obtained. Amounts of sulfuryl chloride used should be not more than 250 wt. percent of sulfuryl chloride based on cyclododecatriene. To obtain preferentially the dichloro derivative amounts of sulfuryl chloride should be in the range of 15 to 100 wt. percent sulfuryl chloride based on cyclododecatriene, to obtain preferentially the tetrachloro derivative amounts of sulfuryl chloride should be in the range of 125 to 180 wt. percent sulfuryl chloride based on cyclododecatriene and to obtain the hexachloro derivative amounts of sulfuryl chloride should be in the range of 200 to 300 wt. percent sulfuryl chloride based on cyclododecatriene. Preferably, a peroxide catalyst is utilized for the reaction. The solvents indicated above may be used if desired but are not necessary in this reaction. Yields of the dichlorocyclododecadiene in the order of 90% are obtained. Fluorine, bromine and iodine derivatives have not been discussed. But in view of the chlorination experiments described herein it can be assumed that these can be prepared by well-known methods.

Elemental fluorine is generally unsatisfactory as a halogenation reagent because of the extremely large amount of heat liberated in this reaction. If fluorine gas is used is must be diluted with large amounts of inert gas, such as nitrogen, before contacting the organic material. Additions of fluorine to the double bonds of cyclododecatriene can be accomplished however by special techniques. One of these consists of treating a solution of cyclododecatriene in an inert solvent with a solution of sulfuryl fluoride. Another is the treatment of cyclododecatriene with hydrogen fluoride in the presence of lead dioxide. Here the active agent is "nascent" lead tetrafluoride.

Bromination of cyclododecatriene may be carried out by methods similar to those described above for chlorination. The evidence indicates that dibromocyclododecatriene and tetrabromocyclododecene can be prepared in this way but the addition of the halogen to all three double bonds if desired is somewhat more difficult than in the case of chlorination.

Iodination is somewhat more difficult than either chlorination or bromination, since the 1,2-diiodides tend to be unstable with the elimination of molecular iodine. Iodine containing products can be obtained, however, by treating cyclododecatriene with iodine monochloride or iodine monobromide. Thus 9-chloro-10-iodo-1,5-cyclododecadiene results when cyclododecatriene is treated with less than 1 mole of iodine monochloride. Iodine containing products can also be prepared by halogen interchange, i.e. by treating an acetone solution of chlorinated or brominated cyclododecatriene with a solution of sodium iodide in acetone. Sodium chloride and sodium bromide are insoluble in acetone and consequently the reaction is driven to the right.

The following examples present data obtained in the laboratories which help to define the present invention.

Example 1

One hundred milliliters (0.55 mole) of cis, trans, trans-1,5,9-cyclododecatriene and 100 ml. of carbon tetrachloride were charged to a reaction flask and the mixture was stirred while adding chlorine gas over a period of two hours. The temperature was maintained at 30–35° C. during the reaction period by means of an ice bath. The weight of the reaction mixture increased to 86 g., i.e. slightly more than two moles of chlorine per mole of triene were adsorbed during the reaction. The carbon tetrachloride was stripped from the product by heating to 160° C. at a reduced pressure of 1 mm. The residue, 172 g., was a dark viscous liquid containing 50.9% chlorine. It was found to be a mixture containing tetrachlorocyclododecene and hexachlorocyclododecane as the major components.

Example 2

One hundred milliliters (0.55 mole) of cyclododecatriene in 100 ml. of carbon tetrachloride was chlorinated as described above until a gain of 68 g. was noted. The product was washed with water, then with dilute potassium carbonate. After drying with calcium chloride the carbon tetrachloride was stripped from the product at reduced pressure and the product was vacuum distilled using a 2′ x ½″ column packed with ⅛″ glass helices operated at a 5:1 reflux ratio. The distillate, collected at 135–160° C. at 0.8–0.6 mm. pressure, analyzed 39.5% chlorine. Since the theoretical chlorine content of dichlorocyclododecadiene is 30.4% and for tetrachlorocyclododecene, 46.6%, the distillate appears to be a mixture of these materials. The residue analyzed 46.6% chlorine which is the theoretical for the tetrachloride.

Example 3

One hundred milliliters of the cyclododecatriene in 100 ml. of n-heptane were chlorinated at 30° C. to a gain in weight of 34.5 g., i.e. something less than one mole of chlorine per mole of triene. The product was worked up as described in Example 2, several fractions of distillate being collected.

| Cut No. | Cut Points | | | | Amount | | $n_D^{20}$ | Cl, Per cent |
|---|---|---|---|---|---|---|---|---|
| | ° C. | @ mm. | to ° C. | @ mm. | Vol., Per cent | Wt., g. | | |
| 1 | 70 | 1.3 | 101 | 1.5 | 10 | 9.6 | 1.5099 | 6.69 |
| 2 | 101 | 1.5 | 114 | 1.5 | 11 | 10.8 | 1.5280 | 20.46 |
| 3 | 114 | 1.5 | 116 | 1.5 | 10 | 10.6 | 1.5320 | 25.57 |
| 4 | 116 | 1.5 | 119 | 1.5 | 10 | 11.6 | 1.5323 | 27.37 |
| 5 | 119 | 1.5 | 120 | 1.5 | 10 | 11.3 | 1.5327 | 29.59 |
| 6 | 120 | 1.5 | 120 | 1.5 | 10 | 11.1 | 1.5332 | 29.70 |
| 7 | 120 | 1.5 | 122 | 1.5 | 9 | 10.5 | 1.5333 | 29.46 |
| 8 | 122 | 1.5 | 118 | 1.0 | 11 | 12.0 | 1.5343 | 30.47 |
| 9 | 118 | 1.0 | 125 | 1.0 | 9 | 10.4 | 1.5357 | 30.81 |
| Residue | | | | | | 21 | | 38.34 |

If one assumes the forecuts to be mixtures of unreacted triene and the dichloro derivative, the yield of dichlorocyclododecadiene, based on the chlorine analyses, was 73% with a selecivity of 89%. This ignores the possibility that there may be some small amount of monochloride derived from substitution of chlorine for one of the hydrogens of the triene or from splitting out of HCl from the dichloro derivative, and in fact the presence of very small amounts of such a monochloride was shown by redistillation of low boiling material from a number of reruns as is shown in Example 6.

Example 4

A reaction flask was charged with 178 g. (1.1 moles) of cyclododecatriene, 200 ml. of carbon tetrachloride and ½ g. of benzoyl peroxide. The mixture was stirred and heated to reflux temperature. Sulfuryl chloride (84 g., 0.62 mole) in carbon tetrachloride (100 ml.) was added dropwise at a rate that just maintained the reflux temperature. When the addition has been completed the mixture was refluxed for an additional hour, cooled and washed with water twice then with dilute sodium hydroxide. The product was dried with potassium carbonate, filtered, and distilled at atmospheric pressure to remove the carbon tetrachloride. The reaction mixture was then fractionated at reduced pressure.

| Fraction | Cut Points | Product | Wt., g. |
|---|---|---|---|
| 1 | 110–114° C. @ 9–9.5 mm | Recovered CDT | 94 |
| 2 | 160° C. @ 9 mm.–160° C. @ 3.5 mm | Dichloride of CDT | 98 |

The conversion of cyclododecatriene was 47%, the selectivity to dichlorocyclododecadiene was 96%. The product was a colorless liquid containing 30% chlorine, theory 30.4%.

Example 5

A reaction flask was charged with 89 g. (0.55 mole) of cyclododecatriene, 100 ml. of carbon tetrachloride and 0.5 g. of benzoyl peroxide. The mixture was stirred and heated to refluxing (80° C.). Sulfuryl chloride (245 g., 1.8 moles) in carbon tetrachloride (150 ml.) was added dropwise at a rate to just maintain a gentle reflux. Refluxing was maintained for ½ hour after the addition was complete. Another 0.25 g. of benzoyl peroxide was added but there was no evidence that this caused further reaction. After another ½ hour refluxing the mixture was cooled to room temperature, washed with water and with potassium carbonate solution. The product was dried with calcium chloride. Carbon tetrachloride was removed by distillation at atmospheric pressure. The product was concentrated further by heating to 90° C. in a rotating vacuum evaporator. The residue, 190 g., contained 53.0% chlorine. The theoretical chlorine content for tetrachlorocyclododecene, $C_{12}H_{18}Cl_4$ is 46.6% and that for hexachlorocyclododecane, $C_{12}H_{18}Cl_6$, is 56.73%. The product produced in this example is a mixture of the two.

Example 6

The fractions boiling between 240° and 335° C. (corrected to 760 mm.) from a number of chlorination runs wherein the mole ratios of chlorine to cyclododecatriene used were less than one were combined and redistilled at reduced pressure using a 2′ x ½″ column packed with ⅛″ glass helices. A reflux ratio of 10:1 was maintained and 10 ml. fractions were collected and examined. The results are tabulated below:

| Fraction No. | Cut Points | | | | $n_D^{20}$ | Percent Cl |
|---|---|---|---|---|---|---|
| | ° C. | mm Hg | to ° C. | mm Hg | | |
| 1 | 100 | 10.0 | 102 | 1.2 | | |
| 2 | 102 | 1.2 | 106 | 1.3 | 1.5301 | |
| 3 | 106 | 1.3 | 107 | 1.5 | 1.5300 | 17.1 |
| 4 | 107 | 1.5 | 107 | 1.5 | 1.5302 | |
| 5 | 107 | 1.5 | 107 | 1.6 | 1.5303 | 17.2 |
| 6 | 107 | 1.6 | 108 | 1.6 | 1.5306 | |
| 7 | 108 | 1.6 | 114 | 2.0 | 1.5304 | 17.8 |
| 8 | 114 | 2.0 | 124 | 1.9 | 1.5310 | |
| 9 | 124 | 1.9 | 113 | 0.9 | 1.5317 | |
| 10 | 113 | 0.9 | 113 | 1.0 | 1.5322 | 29.3 |
| 11 | 113 | 1.0 | 93.5 | 0.1 | 1.5320 | |

The product distilling at 106° C. at 1.3 mm. to 114° C. at 2 mm., monochlorocyclododecatriene, is probably a mixture of isomers.

Throughout this application all percents not otherwise designated are wt. percents.

What is claimed is:

1. The new composition of matter 9,10-dichloro-1,5-cyclododecadiene.
2. The new composition of matter 5,6,9,10-tetrachlorocyclododecene.
3. The new composition of matter 1,2,5,6,9,10-hexachlorocyclododecane.

References Cited in the file of this patent

Migrdichian, "Organic Synthesis," vol. II, Reinhold Publishing Co. (1957), pp. 855–58 relied on.